United States Patent [19]

Lee

[11] 4,370,057

[45] Jan. 25, 1983

[54] METHOD OF VERIFICATION OF A SHEET ELEMENT, SUCH AS A BANKNOTE

[75] Inventor: Peter D. Lee, Hertford, England

[73] Assignee: The Governor and Company of the Bank of England, London, England

[21] Appl. No.: 152,498

[22] Filed: May 22, 1980

Related U.S. Application Data

[62] Division of Ser. No. 881,502, Feb. 27, 1978, Pat. No. 4,290,630.

[30] Foreign Application Priority Data

Mar. 1, 1977 [GB] United Kingdom ................. 8628/77

[51] Int. Cl.$^3$ ...................... G01N 21/00; B42D 15/00

[52] U.S. Cl. ...................................... 356/71; 283/9 R

[58] Field of Search .................. 356/71; 283/8 R, 9 R

[56] References Cited

U.S. PATENT DOCUMENTS

| | | | |
|---|---|---|---|
| 2,225,314 | 12/1940 | McCart | 234/46 X |
| 2,530,319 | 11/1950 | Young | 83/333 X |
| 2,759,542 | 8/1956 | Weisshuhn | 83/333 X |
| 2,922,893 | 1/1960 | Ett | 356/71 X |
| 3,069,653 | 12/1962 | Hirschfeld et al. | 356/71 X |
| 3,486,957 | 12/1969 | Fish et al. | 83/428 X |
| 3,512,130 | 5/1970 | Hulett | 40/2.2 X |
| 3,571,568 | 3/1971 | Ono et al. | 234/47 X |
| 3,605,619 | 9/1971 | Gilstrap | 40/2.2 X |
| 3,645,438 | 2/1972 | Lanahan | 234/48 X |
| 3,662,156 | 5/1972 | Grosbard | 238/8 R X |
| 3,741,053 | 6/1973 | Byrne et al. | 234/48 X |
| 3,858,032 | 12/1974 | Scantlin | 40/2.2 X |
| 3,967,400 | 7/1976 | Otto | 283/7 X |
| 4,129,382 | 12/1978 | Greenaway | 356/71 |
| 4,186,943 | 2/1980 | Lee | 283/9 R X |

FOREIGN PATENT DOCUMENTS 1446851 11/1968 Fed. Rep. of Germany ..... 283/9 R

*Primary Examiner*—Vincent P. McGraw
*Attorney, Agent, or Firm*—Mawhinney & Mawhinney & Connors

[57] ABSTRACT

A sheet element, such as a banknote, has an incorporated authenticating device comprising a film having at least one edge which is provided with a non-rectilinear portion or portions shaped to provide coded information relating to the sheet element. The shape and proportions of said at least one edge of the shaped non-rectilinear portion or portions of said film are sensed to generate a signal dependant upon the shape and proportions of the edge of the film so as to derive the coded information.

5 Claims, 19 Drawing Figures

METHOD OF VERIFICATION OF A SHEET ELEMENT, SUCH AS A BANKNOTE

This is a division of application Ser. No. 881,502 filed Feb. 27, 1978 now U.S. Pat. No. 4,290,630.

FIELD OF THE INVENTION

This invention relates to security devices to prevent forgery and more particularly to devices for authenticating various items of sheet material, such as banknotes, credit cards and other valuable documents, security personnel passes and the like.

BACKGROUND OF THE INVENTION

Present techniques intended to prevent successful counterfeiting of, say, banknotes include the use of intricate designs, watermarks and inlaid linear metallised plastic strips, the intention being that the application of these devices to banknote paper is sufficiently difficult to make it likely that forged notes will be readily recognisable by their poor quality. However, the effectiveness of such preventive measures is continuously being eroded as the techniques and apparatus available to the forger become more advanced and easier to operate, thus making it potentially easier to simulate the present form of banknotes.

It is therefore desirable that the production of the security device, and/or its application to the document concerned should involve the use of devices or resources which, by reason of their nature, complexity, cost or other factors would not normally be available to the forger and would be difficult to imitate successfully. Further it should preferably be readily possible to test the document to establish its authenticity.

SUMMARY OF THE INVENTION

According to one aspect of the invention, there is provided a sheet element having an authenticating device comprising a film having at least one edge which is provided with a non-rectilinear portion or portions. The said portion or portions may be shaped to provide coded information relating to the sheet element.

Preferably the film comprises a narrow strip running through the material of the sheet, for instance as a security thread in a banknote, of which all or part of one or both edges may be contoured and provide said coded information. The contouring of the two sides may be different, and the information may be related to any function of the combination of the two, such as the difference in amplitude, shape or pitch of the contours. Alternatively, the shape of the contour may be provided in order to be difficult to copy or obviously false when copied, to prevent easy withdrawal of the thread or for any other desirable purpose.

The sheet element may be a banknote, the information carried by the edge contour or contours relating, for example, to the denomination or issuing authority of the note. The edge contour or contours may carry further information relating, for example, to a legible number carried by the sheet element to distinguish it from other similar elements, such as the serial number, or part thereof, on a banknote. This or other information may also be carried on the strip in the form of apertures extending therethrough and arranged in a predetermined pattern.

The information carried by the edge contour or contours can be sensed, read and processed, for instance optically, magnetically or by any other suitable means to verify the authenticity of the sheet element and to identify the characteristics of the element to which this information relates.

According to a further aspect of the invention, a method of verification comprises providing a sheet element as hereinbefore defined in which the non-rectilinear portion or portions is or are shaped to provide coded information relating to the sheet element and sensing said at least one edge of the authenticating device to derive said coded information.

According to another aspect of the invention there is provided a method of slitting a sheet comprising operating slitting means to slit the sheet along one or more slitting lines and separating the sheet along said slitting line or lines into a plurality of films, each having at least one edge the shape of which is defined by the shape of a said slitting line, and is provided with a non-rectilinear portion or portions.

A particular method, according to this aspect of the invention, of slitting a sheet to produce a plurality of strips comprises directing a plurality of beams of electromagnetic or corpuscular radiation at the sheet, advancing the sheet relative to the beams, said beams defining a plurality of impingement points mutually spaced laterally of the direction of relative advancement of the sheet, and separating the sheet along the paths followed by said impingement points.

In a preferred embodiment a plurality of substantially parallel laser slitting beams, derived from a single main beam, are directed toward the sheet to penetrate and cut the said sheet, the slitting beams being controlled in any required manner to displace the said impingement points laterally of said direction of advancement to produce strips having coded edge contours.

Alternatively, the strips may be provided with a suitable contour or contours by producing suitably shaped slitting lines by means of rotary mechanical cutters, dies, heated wires or high pressure fluid jets; a combination of such slitting means and one or more slitting beams may alternatively be employed. For example a set of of spaced alternatively arranged rotary cutters and laser beams may be so controlled that the cutters produce straight edges and the beams produce predetermined contoured edges of adjacent strips.

DESCRIPTION OF THE DRAWINGS

Reference will now be made to the accompanying drawings, in which.

DETAILED DESCRIPTION OF THE PREFERRED EMBODIMENTS

Figure 2:
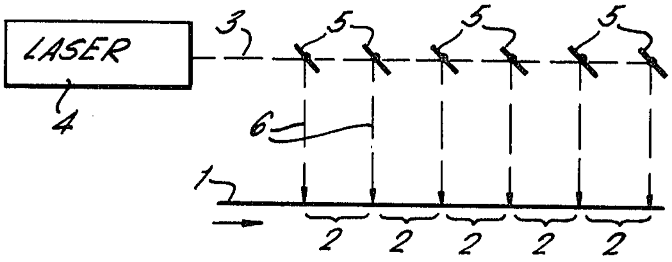
FIG. 2 illustrates a technique for slitting the sheet into a number of such strips.

With reference first to FIGS. 1 and 2, a technique of slitting a sheet 1 of suitable material into a multiplicity of similar security films, in the form of strips, or threads 2, is diagrammatically illustrated. A laser beam 3 from a source 4 is divided by a system of partially reflecting pivotable mirrors 5 into a number of slitting beams 6 directed towards the sheet 1 to impinge substantially normally thereon. This sheet may, for instance, be made of a similar metallic coated material to that currently used for making security threads for banknotes, or of magnetic or other coated or uncoated material including the thin film coated substrate material disclosed in our copending Patent Application No. 39820/76. The advantages in employing this latter material will be discussed later.

The sheet 1 is advanced relative to the slitting beams 6 in a direction, in its own plane, normal to the plane of FIG. 2, and the mirrors are controllably pivoted in accord with a predetermined programme about pivot axes also normal to the plane of FIG. 2 to cause the impingement points of the slitting beams 6 on the sheet 1 to follow predetermined meandering paths 7. The beams 6 are of sufficient power to cut through the sheet material, and these paths 7 accordingly define the edges of the strips, or threads 2 into which the sheet 1 is subsequently divided. Each pair of adjacent slitting beams defines the two lateral edges of a respective thread 2. The mirrors 5 may for instance be pivoted synchronously and cyclically so that the paths 7 are at all points parallel to each other, to form threads, such as those illustrated in FIGS. 1*c* and 1*d*, of substantially constant width measured transverse the direction of relative advancement. Alternatively, the cyclic control of the mirrors may be such that each is pivoted in antiphase to its immediate neighbours to form threads such as those illustrated in FIGS. 1*a* and 1*b*, of cyclically varying width.

Figure 7:
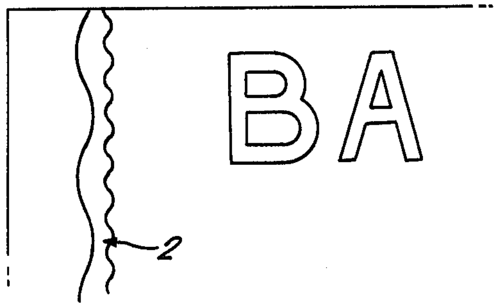
FIG. 7 illustrates a part of a banknote incorporating yet another different security thread.
Figure 8:
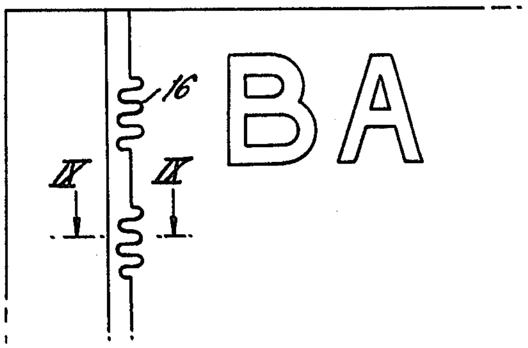
FIG. 8 illustrates a part of a banknote incorporating yet another different security thread.

In another method, adjacent mirrors may be pivoted so as to produce contours of different pitch and amplitude as in FIG. 7, or with at least one straight edge as in 1*e* or intermittently as in FIG. 8.

Figure 1A:
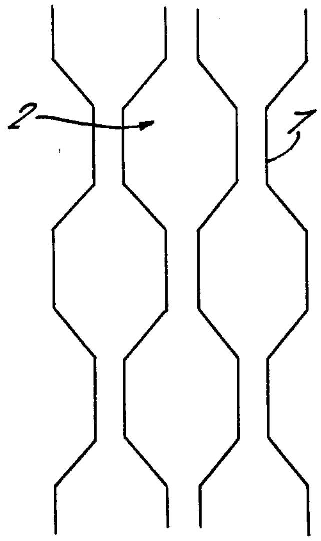
FIGS. 1*a* to 1*e* illustrate five alternative ways in which a sheet may be divided into a number of strips each with at least one contoured edge.
Figure 1B:
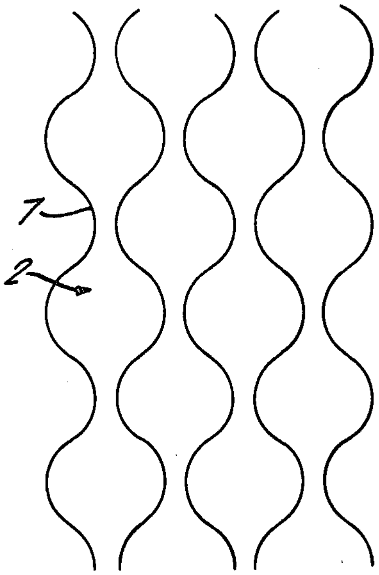
Figure 1C:
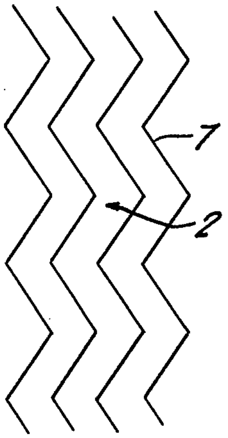
Figure 1D:
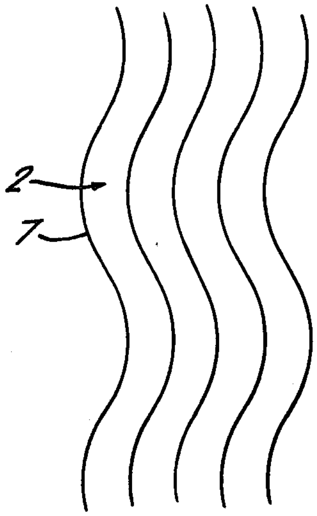
Figure 1E:
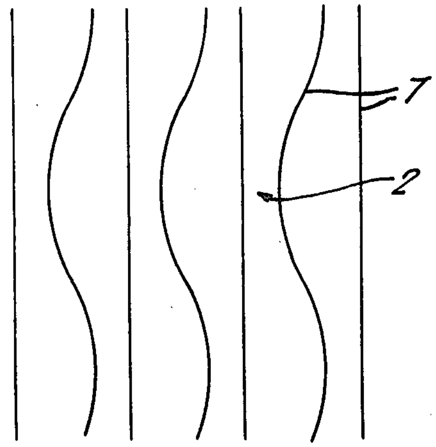
Figures 3A, 3B, 3C, 3D, 3E, 3F, 3G:
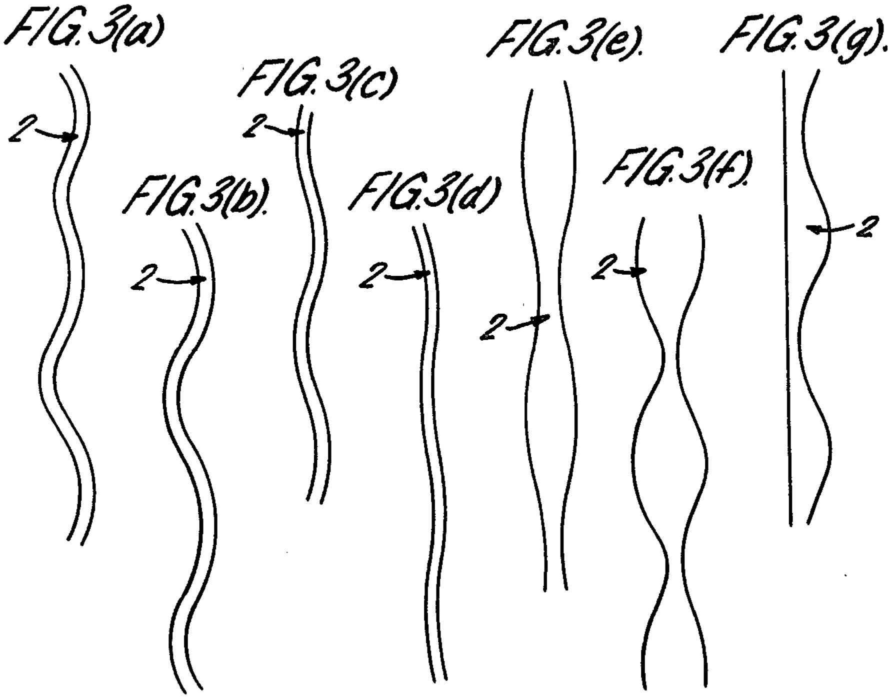
FIGS. 3*a* to 3*g* illustrate a number of different shapes for a security thread to be inserted in a banknote to indicate characteristics such as the denomination or issuing authority of the banknote.

The threads 2, after separation, may be cut into suitable lengths which are then inserted into or affixed to the surface of the sheet material of the documents concerned. In this particular instance the lengths of thread are worked into the paper of banknotes in place of the straight edged thread currently employed. The various dimensional parameters of the edge variations of the thread, such as basic shape, pitch or period of repetition, width ratios where the width of the thread changes, or the differences between any such properties of the two edges can be chosen to relate to particular features of the banknote, such as the issuing authority, denomination, note cypher. FIGS. 3*a* to 3*g* illustrate seven threads of different shapes, of which the first four, FIGS. 3*a* to 3*d*, are of constant width but of a serpentine configuration, with different pitches and amplitudes for four different denominations of banknote, for example 1, 5, 10 or 20 units of currency, two, FIGS. 3*e*, 3*f* are of sinusoidally varying width, with different patterns of width variations for two different issuing authorities, and one, FIG. 3*g* has one recilinear edge contour. The nonrectilinear edges of the strips of FIGS. 1 and 3 are all of a wavy shape.

Figure 4:
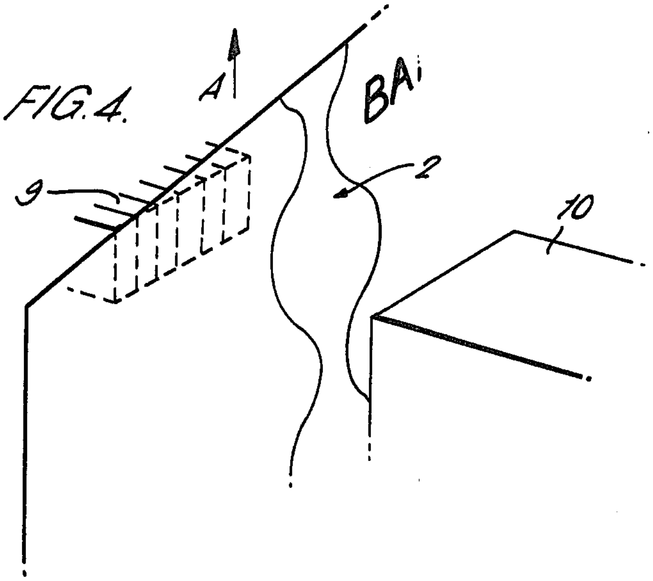
FIG. 4 illustrates a technique for veryifying a banknote incorporating a security thread by optically detecting the edge contours of the thread.

The form of security thread described above facilitates interrogation to check the authenticity of the banknote or other document incorporating the thread by means of a relatively simple device such as that illustrated in FIG. 4 of the drawings. The interrogation device illustrated includes a photo-diode array 9, an optical assemly 10 positioned and arranged to illuminate the array 9 with a collimated light beam, and means (not shown) defining a travel path for a banknote 11, such that the banknote will pass through the gap between the optical assembly 10 and the photo-diode array 9 with the security thread 2 interrupting the light path therebetween. The banknote is constrained to travel, relative to the array 9 and assembly 10 in a direction indicated by arrow A, substantially parallel to the thread 2 so that in a period whose duration depends upon the length of the thread and the speed of travel of the banknote the entire length of the thread will pass in front of and partially mask the array 9 which will accordingly generate a specific recognisable signal whose waveform depends upon the shape and proportions of the thread 2. It may not be necessary to scan the entire length of the thread, but to choose an adequate sample or samples of the strip length to enable the dominant pattern to be decoded, thus eliminating the random effect of overprinting and soiling. The derived signal could be checked against a replaceable programmable device defining the predetermined waveform of a particular thread type. The signal could be employed for instance in a note-sorting machine to verify and sort the notes according to denomination, origin or batch, or in a vending machine to activate a mechanism for supplying the goods or material concerned, and for determining and rendering the appropriate change. Other interrogation systems may be employed such as one which responds to the difference between the magnetic properties such as permeability of the thread material and that of the surrounding paper to produce specific signal waveforms in accordance with the edge contours of the thread within the note.

It is also envisaged to use a verification system on which the banknote or other document is moved at right angles to the direction of the thread or in which the document is held stationary whilst it is scanned in any appropriate direction.

The above described techniques accordingly provide means of encoding information which might be printed, or otherwise legibly provided on a document, by forming a security thread incorporated in or on the document with a predetermined edge contour.

Figure 5:
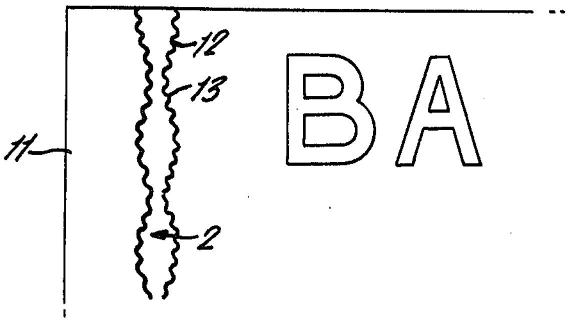
FIG. 5 illustrates a part of a banknote incoporating a security thread.
Figure 6:
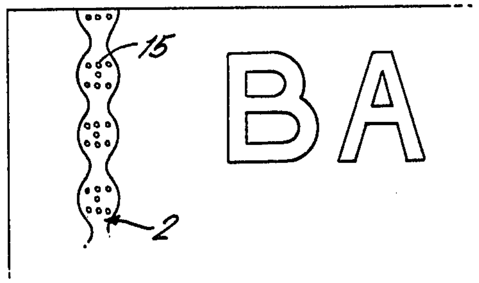
FIG. 6 illustrates a part of a banknote incorporating a different security thread.

Further information concerning the document can readily be encoded on the security thread, as illustrated in FIGS. 5 and 6. FIG. 5 illustrates a banknote 11 of which the security thread 2 has two wavy edges providing an overall coded width variation, with a relatively greater periodicality coded contour 12 on all or part of the thread edges. The further information carried in the contour 12 may also be legibly provided on the document, such as the serial number, or part thereof, on a banknote, or alternatively may be non-evident data such as the date of manufacture of the paper, or of printing of the banknote. A somewhat more advanced interrogation device than that illustrated in FIG. 4 will clearly be required to decode the two superimposed edge contours of the thread shown in FIG. 5.

It is also envisaged that by introducing a common relationship between an attribute of the contoured edge or edges, such as the number of peaks per unit of thread length, and the value of the document or banknote, a basis would be constituted for use in a machine capable of dispensing notes to a total value to be keyed into the machine as a total number of peaks or accepting and accounting for a number of mixed notes by totalling the number of peaks.

A further development comprises the incorporation in the thread 2 of a pattern of fine holes 15 (see FIG. 6) produced by a laser or other means, and representing a code which may be independent, or may be related to any information found elsewhere on the thread or in the printing on the banknote. This pattern could be produced mechanically or by a laser assembly before the thread is incorporated in the paper or incorporated in the printing machine which prints the banknotes, and could therefore encode information related to printed references, once again serial numbers or parts thereof on the banknote.

In FIG. 7, primary and secondary information is encoded on opposite edges of the strip 2 in the form of wavy, or oscillatory contouring of which the periodicity and/or amplitude independently determines the information concerned.

In FIG. 8, information is encoded on a contoured edge of the strip, the contour consisting of groups 16 of wavy, or oscillatory variations. The lengths and/or spacing of the groups may be the variable characteristics employed to encode the information.

Many types of material can be used for the sheet from which the threads are cut, so that the threads may be plain, coloured, printed, coded, coated with a thin film, metallic, magnetic, partially magnetic or any other preferred type of thread material in a chosen pattern with very little restriction.

The codes applied to the edge contour of the strip or thread could be internationally agreed, so that a single encoding system could encompass banknotes of many different currencies, and a banknote of any of the currencies could be verified in a common verification device suitably programmed.

Figure 9:
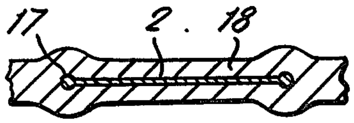
FIG. 9 is a section through a security thread as worked into a banknote, for example as taken on line IX—IX of FIG. 8.

An advantageous feature of the above-described note verification system, as discussed at the outset, is the increased difficulty of forging a banknote containing it to a deceptive visual standard as compared with the uniform thread currently used in banknotes. Forgeries could accordingly be more easily detected by the public. Forgery to a standard of accuracy required to defeat a verification device, especially one adapted to the form of thread illustrated in FIGS. 5 and 6, would be more difficult to achieve. Where the material of the thread is coated to produce the optical characteristics described in our afore-mentioned co-pending patent application, the difficulty in producing a deceptive forgery is increased even further.

Where the laser or other method of slitting by heat is employed, a raised bead 17 is formed along the edge as shown in cross-section in FIG. 9. When the thread is worked into the paper 18 of the banknote this forms a corresponding raised pattern in the paper which is visually recognisable, adding to the difficulty of making a deceptive forgery. It may also assist the Blind by providing a tactile method of authenticating notes and discriminating between denominations.

The formation of the threads in the manner illustrated in FIGS. 1 and 2 minimises wastage of the sheet material. This can be an important advantage when the quantity and cost of such material employed in the production of banknotes is considered.

The form of security thread described herein could readily be incorporated in present banknotes with little or no change to the note design, though some development of the current techniques employed for working the thread into the banknote paper might be required due to the non-uniform shape, thus fulfilling or enchancing the afore-mentioned desired object of making foregery more difficult.

I claim:

1. A method of verification of a sheet element, such as a banknote, comprising providing the sheet element with an incorporated authenticating device comprising a film having at least one edge which is provided with a non-rectilinear portion or portions which are shaped to provide coded information relating to the sheet element, and sensing the shape and proportions of said at least one edge of said shaped non-rectilinear portion or portions of said film to generate a signal dependent upon the shape and proportions of the edge of the film so as to derive said coded information.

2. A method according to claim 1 in which said at least one edge is sensed optically by advancing the sheet element relative to an illumination light beam and by sensing the variation in intensity of the light beam a modulated when said at least one edge is illuminated by the light beam.

3. A method according to claim 2 in which the intensity of the light beam as transmitted through the sheet element is sensed.

4. A method according to claim 3 in which the sheet element is advanced in a direction substantially lengthwise of said at least one edge.

5. A method according to claim 3 in which the sheet element is advanced in a direction transverse of said at least one edge.

* * * * *